United States Patent
Cui et al.

(10) Patent No.: US 12,301,468 B2
(45) Date of Patent: May 13, 2025

(54) MULTIPATH TRANSMISSION CONTROL METHOD AND DEVICE ORIENTED TO DEADLINES OF DATA BLOCKS

(71) Applicant: Tsinghua University, Beijing (CN)

(72) Inventors: Yong Cui, Beijing (CN); Xutong Zuo, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 393 days.

(21) Appl. No.: 17/825,554

(22) Filed: May 26, 2022

(65) Prior Publication Data
US 2022/0393989 A1 Dec. 8, 2022

(30) Foreign Application Priority Data
Jun. 2, 2021 (CN) .......................... 202110615764.1

(51) Int. Cl.
*H04L 47/283* (2022.01)
*H04L 5/00* (2006.01)
*H04L 47/56* (2022.01)

(52) U.S. Cl.
CPC .......... *H04L 47/283* (2013.01); *H04L 5/0096* (2013.01); *H04L 47/564* (2013.01)

(58) Field of Classification Search
CPC ... H04L 47/283; H04L 5/0096; H04L 47/564; H04L 5/0078; H04L 72/283; H04W 72/1221
See application file for complete search history.

(56) References Cited

U.S. PATENT DOCUMENTS

| | | | |
|---|---|---|---|
| 2020/0236043 A1* | 7/2020 | Sze | H04L 49/90 |
| 2022/0393970 A1* | 12/2022 | Amend | H04L 47/24 |
| 2023/0059658 A1* | 2/2023 | Kucera | H04W 76/15 |

OTHER PUBLICATIONS

Chuat et al., "Deadline-Aware Multipath Communication: An Optimization Problem," 47th Annual IEEE/IFIP International Conference on Dependable Systems and Network (DSN), 2017.
CNIPA, First Office Action for CN Application No. 202110615764.1, Feb. 22, 2022.

* cited by examiner

*Primary Examiner* — Hanh N Nguyen
(74) *Attorney, Agent, or Firm* — Hodgson Russ LLP

(57) ABSTRACT

A multipath transmission control method oriented to deadlines of data blocks, includes: allocating transmission paths and timeslots to multiple data blocks to be sent at a sender according to heterogeneous attributes of the multiple data blocks and current network conditions, wherein the heterogeneous attributes comprise deadlines, sizes and priorities of the multiple data blocks; determining whether sending condition changes; and when the sending condition changes, rescheduling the multiple data blocks to be sent.

8 Claims, 3 Drawing Sheets

MULTIPATH TRANSMISSION CONTROL METHOD AND DEVICE ORIENTED TO DEADLINES OF DATA BLOCKS

CROSS-REFERENCE TO RELATED APPLICATIONS

This application claims priority to Chinese Patent Application No. 202110615764.1, filed Jun. 2, 2021, the entire disclosure of which is incorporated herein by reference.

FIELD

The present disclosure relates to the technical field of end-to-end multipath transmission control, in particular to a multipath transmission control method and device oriented to deadlines of data blocks.

BACKGROUND

Applications place many requirements on services at the transport layer, such as end-to-end latency and throughput. End-to-end latency is widely concerned by interactive applications, such as video conferencing and online virtual reality (VR), which often expect data to arrive before a specific deadline. In these applications, data is usually transmitted in blocks (e.g., frames in a video conference, tiles in VR). If the above blocks fail to reach the receiver within their deadlines, the user experience will be greatly affected. For example, VR games have an interactive latency requirement of 25 ms. If the latency exceeds the threshold, users will be dizzy. In a video conference, in order to enable users to have an interactive application experience, the end-to-end delay usually needs to reach 100 ms or even lower. Therefore, data for these applications should arrive at the receiver before the deadline.

Compared with single-path transmission, multipath transmission can provide seamless handover and larger aggregated bandwidth, and thus has more advantages in the above scenarios. Various multipath scheduling strategies have been proposed, and there are many applications that support multipath solutions. In recent years, a lot of research work has been carried out on multipath scheduling scheme. One solution is to select the path with the smallest delay among the available paths when scheduling the data packet, in order to reduce the completion time of the data packet. However, this scheduling method does not consider the deadline of the upper-layer application data. If the delay of the selected path exceeds the deadline of data blocks, the data packets will miss the deadline, which will affect the user experience. Another solution is to minimize the completion time of a single block. However, this solution does not take into account the impact of the arrival of subsequent blocks on the completion of the current blocks. When multiple blocks exist at the sender, multiple blocks will compete for paths with small delays, resulting in preemption, and further resulting in wasted bandwidth and preventing blocks from meeting the deadline.

SUMMARY

In a first aspect, a multipath transmission control method oriented to deadlines of data blocks is provided, including:

allocating transmission paths and timeslots to multiple data blocks to be sent at a sender according to heterogeneous attributes of the multiple data blocks and current network conditions, wherein the heterogeneous attributes include deadlines, sizes and priorities of multiple data blocks;

determining whether the sending condition changes; and when the sending condition changes, rescheduling sending of multiple data blocks by the sender.

In a second aspect, a multipath transmission control device oriented to deadlines of data blocks is provided, including:

a processor; and a memory, configured to store instructions executable by the processor, wherein the processor is configured to:

allocate transmission paths and timeslots to multiple data blocks to be sent at a sender according to heterogeneous attributes of the multiple data blocks and current network conditions, wherein the heterogeneous attributes comprise deadlines, block sizes and priorities of the multiple data blocks;

determine whether a sending condition changes; and when the sending condition changes, reschedule the multiple data blocks to be sent.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the accompanying drawings, in which.

DETAILED DESCRIPTION

Figure 1:
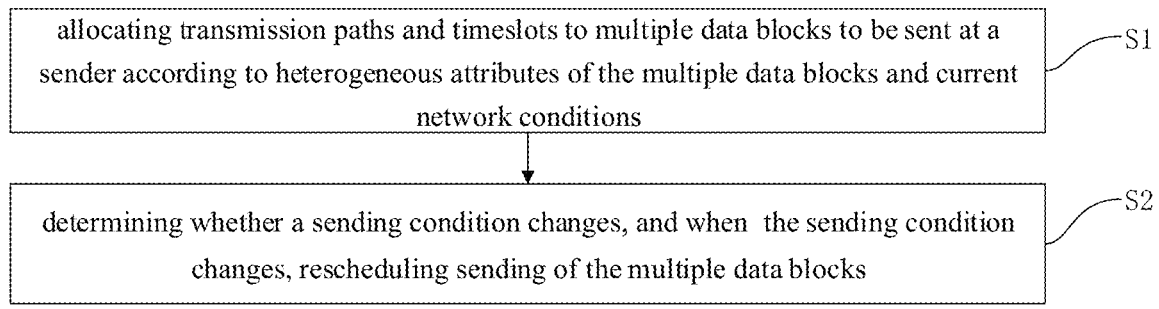
FIG. 1 is a flowchart of a multipath transmission control method oriented to deadlines of data blocks according to embodiments of the present disclosure.

Reference will be made in detail to embodiments of the present disclosure. Embodiments of the present disclosure will be shown in drawings, in which the same or similar elements and the elements having same or similar functions are denoted by like reference numerals throughout the descriptions. Embodiments described herein with reference to drawings are explanatory, serve to explain the present disclosure, and are not construed to limit embodiments of the present disclosure.

Existing multipath scheduling schemes have the problem of bandwidth waste caused by the lack of awareness of deadlines. When multiple data blocks exist at the sender, subsequent unknown blocks will affect the current scheduling decision. The user experience should not be degraded by causing subsequent more important or urgent blocks miss the deadline in order to minimize the completion time of a single packet or block.

The following describes the multipath transmission control method and device oriented to deadlines of data blocks according to embodiments of the present disclosure with reference to the accompanying drawings.

First, a multipath transmission control method oriented to deadlines of data blocks according to an embodiment of the present disclosure will be described with reference to the accompanying drawings.

FIG. 1 is a flowchart of a method for multipath transmission control oriented to deadlines of data blocks according to embodiments of the present disclosure.

As illustrated in FIG. 1, the method includes following steps.

In step S1, data transmission paths and timeslots are allocated to multiple data blocks to be sent according to heterogeneous attributes of the multiple data blocks and current network conditions.

The heterogeneous attributes of the multiple data blocks include deadlines, sizes and priorities of the multiple data blocks.

According to the heterogeneous attributes of the data blocks from the application and the network conditions, the data transmission paths and timeslots are allocated at the transport layer of the sender, so as to ensure that the data transmitted to the receiver in the multipath scenario will arrive before the deadline.

In step S2, it is determined whether a sending condition changes, and if the sending condition changes, the data blocks to be sent are rescheduled.

In some embodiments, when a new data block to be sent arrives at the sender, or when there is an idle path, or when the current network conditions changes, it is determined that the sending condition changes.

During the process of sending data blocks, it is monitored whether events such as the arrival of new data blocks at the sender, the existence of idle path, and changes in network conditions occur. If the occurrence of the above event is detected, the sender is triggered to perform data block scheduling and path allocation.

When a new data block arrives at the sender, due to the different priorities and deadlines of the data blocks, subsequent data blocks may need to be sent first, that is, data transmission preemption occurs, and data transmission needs to be rescheduled at this time.

When the network changes, the data blocks being sent may not reach the receiver before the deadline as planned, and the urgency of the data blocks in the buffer will also change. At this time, data transmission needs to be rescheduled.

When there is an idle path, in order to reduce bandwidth waste, the idle path needs to be used under the condition that the data deadline is met, and at this time, data transmission needs to be rescheduled.

Figure 2:
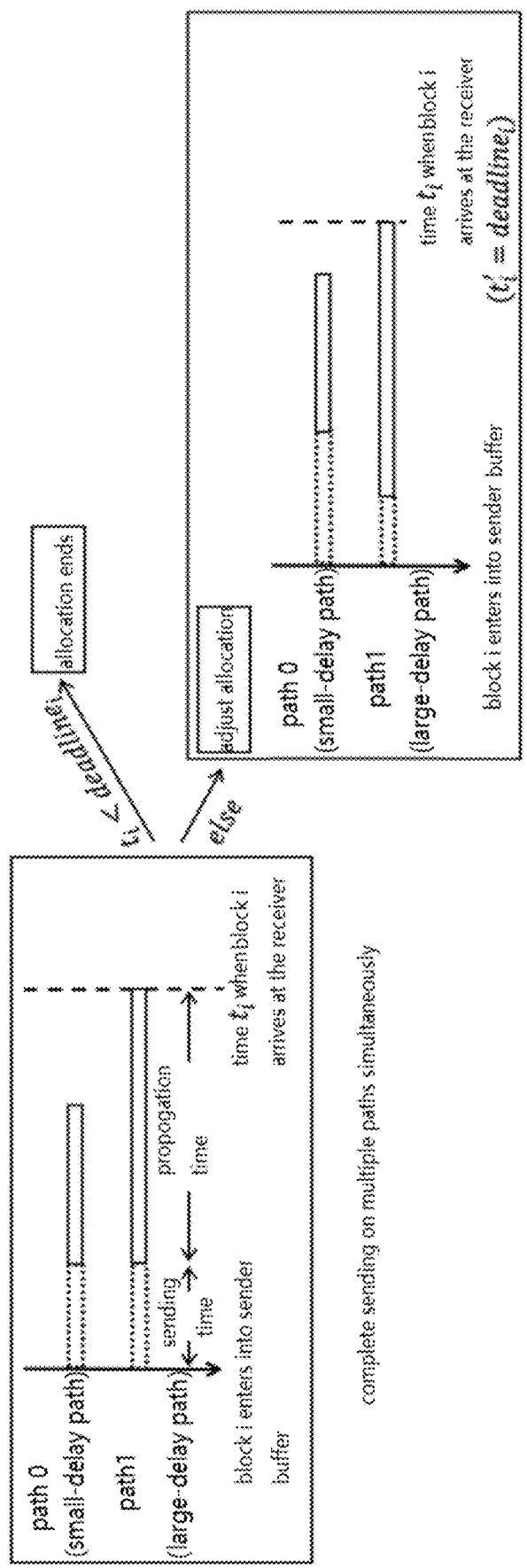
FIG. 2 is a schematic diagram of a multipath allocation strategy according to an embodiment of the present invention.

In an embodiment, as shown in FIG. 2, in order to reduce the preemption of the current sending block by subsequent blocks during multipath allocation of data, a strategy in which the data blocks are sent on multiple paths with the same sending time is adopted. When the data blocks continuously arrive at the buffer of the sender, the data block to be sent preferentially is determined according to the deadlines and the application priorities of the data blocks.

In some embodiments, for multipath allocation, a strategy of simultaneously finish sending of a block on multiple paths is adopted, that is, calculate the corresponding sending time when the sending time on multiple paths is the same, and determine whether sending the current data block with this sending time can satisfy the deadline. If the sending time can satisfy the deadline of the block, the data allocation is completed according to this sending time, that is, the amount of data allocated on each path is the product of the bandwidth and the sending time.

If the sending time cannot satisfy the deadline of the current block, the allocation ratio of data on the multiple paths is adjusted, and the data on the path with large delay is transferred to the path with small delay, until the data sent on the path with large delay can also meet the deadline for sending data blocks. If the deadline cannot be satisfied by transfer, the data block cannot reach the receiver before the deadline, and this data block cannot participate in data block scheduling.

For data block scheduling, when data blocks continuously arrive at the buffer of the sender, the data block to be sent preferentially is determined according to the deadlines and application priorities of the data blocks, as follows.

The sending time $\{send_i\}$ of each data block at the buffer of the sender is calculated, and the maximum sending time is taken as the threshold bound=$\max(\{send_i\})$ for determining whether a data block participates in data block scheduling.

The slack time of each data block at the buffer of the sender is calculated according to the following formula:

$$slack_i = deadline_i - \max(sendt_k + propagt_k)$$

where, $deadline_i$ represents the deadline of the i-th block, $sendt_k$ and $propagt_k$ represent the transmission delay and propagation delay of the block i on the kth path, respectively.

It is determined whether the data block participates in data block scheduling according to the following formula:

$$D_i = \begin{cases} \text{True,} & slack_i < bound \\ \text{False,} & \text{else} \end{cases}$$

In some embodiments, the method further includes: dividing the data blocks to be sent according to the deadlines and priorities of the data blocks to be sent, storing them in the corresponding priority queues, and selecting the data block with the shortest sending time in the highest priority queue among the non-empty priority queues for sending first during scheduling.

For the data participating in the data block scheduling, it is put into the corresponding priority queue according to the priority, and the block with the shortest sending time in the highest priority queue in the non-empty priority queue is selected to be sent first during scheduling.

Figure 3:
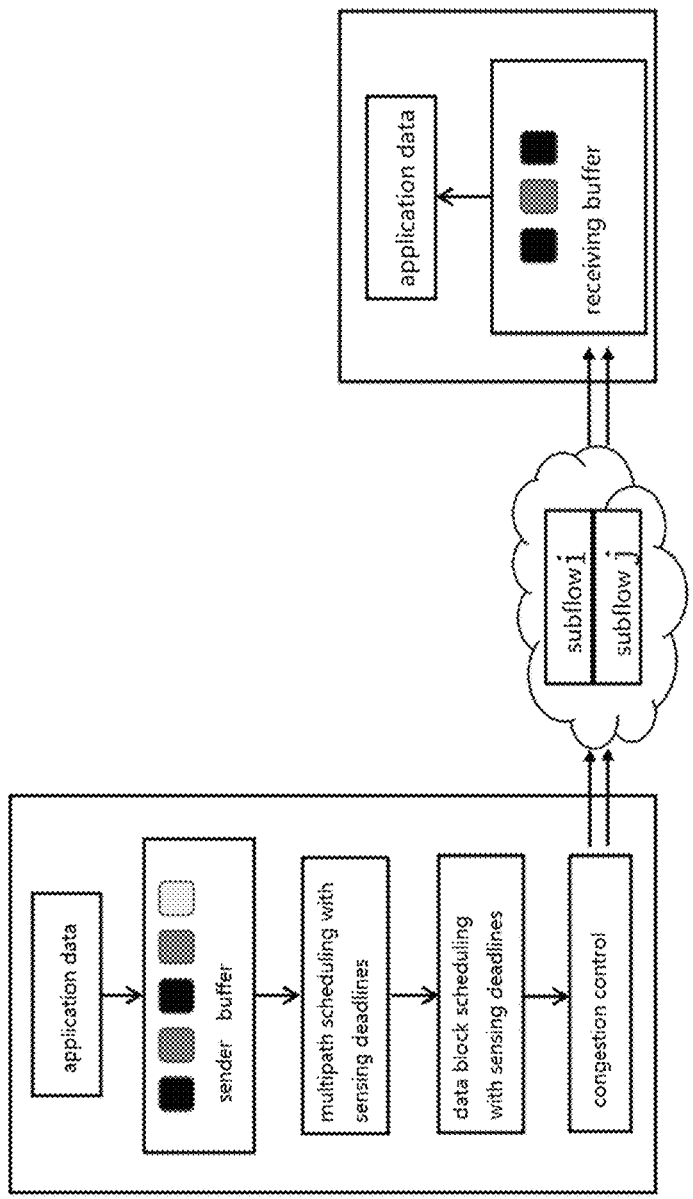
FIG. 3 is a schematic diagram of a multipath transmission control method oriented to deadlines of data blocks according to an embodiment of the present disclosure.

As shown in FIG. 3, the execution flow of the multipath transmission control method oriented to deadlines of data blocks is: 1) during the data transmission process, monitoring whether events such as the arrival of a new data block at the sender, the existence of idle path, and changes in network conditions occur; 2) when allocating data in multiple paths, in order to reduce the preemption of the current sending block by subsequent blocks, adopting a data allocation strategy in which the data blocks are sent on multiple paths with the same sending time; 3) when the data blocks reach the sender buffer continuously, determining the data block to be sent first according to the deadlines and application priorities of the data blocks. Embodiments of the present disclosure can allocate data transmission paths and timeslots at the transport layer of the sender according to the deadlines of the application data blocks and the network conditions, so that the data transmitted to the receiver in the multipath scenario arrives before the deadline.

According to the multipath transmission control method oriented to the deadlines of the data blocks proposed by embodiments of the present disclosure, by sensing the deadline of application data, all data blocks in the buffer of the sender are scheduled and multipath allocation is performed, so that more data blocks arrive at the receiver before the deadline.

Next, the multipath transmission control device oriented to deadlines of data blocks according to embodiments of the present disclosure will be described with reference to the accompanying drawings.

Figure 4:
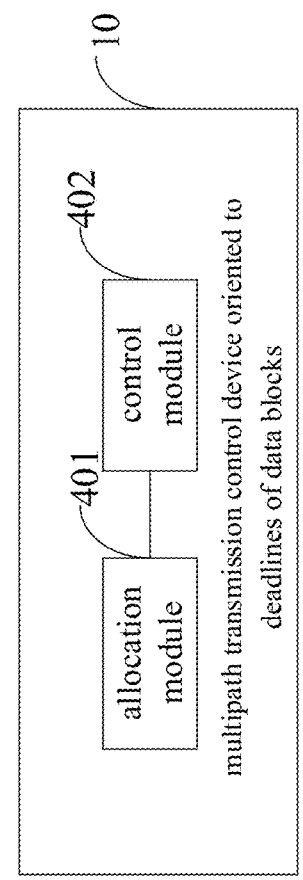
FIG. 4 is a block diagram of a multipath transmission control device oriented to deadlines of data blocks according to embodiments of the present disclosure.

FIG. 4 is a block diagram of a multipath transmission control device oriented to deadlines of data blocks according to an embodiment of the present disclosure.

As shown in FIG. 4, the multipath transmission control device 10 oriented to deadlines of data blocks includes: an allocation module 401 and a control module 402.

The allocation module 401 is configured to allocate transmission paths and timeslots to multiple data blocks to be sent at a sender according to heterogeneous attributes of the multiple data blocks and current network conditions. The heterogeneous attributes include deadlines, sizes and priorities of the multiple data blocks.

The control module 402 is configured to determine whether a sending condition changes, and when the sending condition changes, reschedule the multiple data blocks to be sent.

In some embodiments, when a new data block to be sent arrives at the sender, or when there is an idle path, or when the current network conditions changes, it is determined that the sending condition changes.

In some embodiment, the control module is further configured to:
  allocate the transmission paths according to a strategy of simultaneously finish sending on multiple paths for data blocks to be sent;
  determine whether sending the data blocks using the sending time can satisfy the deadline;
  if the sending time can satisfy that the data blocks reach the receiver before the deadline, perform data allocation according to the sending time;
  if the sending time cannot satisfy that the data blocks reach the receiver before the deadline, adjust an allocation ratio of the data blocks on the multiple paths and transfer data on a path with large delay to a path with small delay until the data block sent on the path with large delay can satisfy the deadline of the data block; and
  if after the transferring, the sending time still cannot satisfy that the data block reaches the receiver before the deadline, determine that the data block does not participate in this round of scheduling.

In some embodiments, the control module is further configured to divide the data blocks to be sent according to deadlines and priorities of the data blocks to be sent, store the data blocks to be sent into corresponding priority queues, and select the data block with the shortest sending time in the highest priority queue in non-empty priority queues during scheduling to be sent first.

It should be noted that the foregoing explanations of the method embodiment are also applicable to the device of this embodiment, and details are not repeated here.

According to the multipath transmission control device oriented to deadlines of data blocks proposed by embodiments of the present disclosure, by sensing the deadline of application data, all data blocks in the buffer of the sender are scheduled and multipath allocation is performed, so that more data blocks arrive at the receiver before the deadline.

Embodiments of the present disclosure further provide a multipath transmission control device oriented to deadlines of data blocks. The device includes a processor and a memory. The memory is configured to store instructions executable by the processor. The processor is configured to implement the multipath transmission control method oriented to deadlines of data blocks described above by executing the instructions stored in the memory.

It should be noted that the foregoing explanations of the method embodiment are also applicable to the device of this embodiment, and details are not repeated here.

The terms "first" and "second" are only used for descriptive purposes, and should not be construed as indicating or implying relative importance or implicitly indicating the number of technical features indicated. Thus, a feature delimited with "first", "second" may expressly or implicitly include at least one of that feature. In the description of the present disclosure, "plurality" means at least two, such as two, three, etc., unless otherwise expressly and specifically defined.

Reference throughout this specification to "an embodiment," "some embodiments," "an example," "a specific example," or "some examples," means that a particular feature, structure, material, or characteristic described in connection with the embodiment or example is included in at least one embodiment or example of the present disclosure. The appearances of the above phrases in various places throughout this specification are not necessarily referring to the same embodiment or example of the present disclosure. Furthermore, the particular features, structures, materials, or characteristics may be combined in any suitable manner in one or more embodiments or examples. In addition, different embodiments or examples and features of different embodiments or examples described in the specification may be combined by those skilled in the art without mutual contradiction.

Although embodiments of present disclosure have been shown and described above, it should be understood that above embodiments are just explanatory, and cannot be construed to limit the present disclosure, for those skilled in the art, changes, modifications, alternations, and variations can be made to the embodiments within the scope of the present disclosure.

What is claimed is:

1. A multipath transmission control method oriented to deadlines of data blocks, comprising:
  allocating transmission paths and timeslots to multiple data blocks to be sent at a sender according to heterogeneous attributes of the multiple data blocks and current network conditions, wherein the heterogeneous attributes comprise deadlines, sizes and priorities of the multiple data blocks;
  determining whether a sending condition changes; and
  when the sending condition changes, rescheduling the multiple data blocks to be sent;
  wherein the method further comprises:
    allocating the transmission paths according to a strategy where data blocks to be sent are sent on multiple paths with a same sending time;
    determining whether sending the data blocks using the sending time can satisfy the deadline;
    in a case where the sending time satisfies that the data blocks reach the receiver before the deadline, performing data allocation according to the sending time;
    in a case where the sending time does not satisfy that the data blocks reach the receiver before the deadline, adjusting an allocation ratio of the data blocks on the multiple paths and transferring data on a path with large delay to a path with small delay until the data block sent on the path with large delay can satisfy the deadline of the data block; and in a case where after the transferring, the sending time still does not satisfy the deadline, determining that the data block does not participate in scheduling;

wherein allocating the transmission paths according to a strategy of simultaneously finish sending on multiple paths for data blocks to be sent comprises:

calculating a sending time {$send_i$} of each data block at the sender buffer, and taking the maximum sending time as a threshold bound=max({$send_i$}) for determining whether a data block participates in data block scheduling;

calculating a slack time of each data block at the sender buffer according to a formula of:

$$slack_i = deadline_i - \max(sendt_k + propagt_k)$$

where, $deadline_i$ represents the deadline of the i-th block, $sendt_k$ and $propagt_k$ represent a transmission delay and a propagation delay of the block i on the kth path, respectively; and determining whether the data block participates in data block scheduling according to a formula of:

$$D_i = \begin{cases} \text{True,} & slack_i < bound \\ \text{False,} & else \end{cases}.$$

2. The method according to claim 1, wherein, when a new data block to be sent arrives at the sender, or when there is an idle path, or when the current network conditions changes, it is determined that the sending condition changes.

3. The method of claim 2, wherein when a new data block arrives at the sender, the data blocks to be sent at the sender is rescheduled according to deadlines and priorities of the data blocks.

4. The method of claim 1, further comprising:

dividing the data blocks to be sent according to deadlines and priorities of the data blocks to be sent, storing the data blocks to be sent into corresponding priority queues, and selecting the data block with the shortest sending time in the highest priority queue for priority sending during scheduling, wherein the highest priority queue is selected from non-empty priority queues having at least one of the data block.

5. A multipath transmission control device oriented to deadlines of data blocks, comprising:

a processor; and a memory, configured to store instructions executable by the processor, wherein the processor is configured to:

allocate transmission paths and timeslots to multiple data blocks to be sent at a sender according to heterogeneous attributes of the multiple data blocks and current network conditions, wherein the heterogeneous attributes comprise deadlines, sizes and priorities of the multiple data blocks;

determine whether a sending condition changes; and when the sending condition changes, reschedule the multiple data blocks to be sent;

wherein the processor is further configured to:

allocate the transmission paths according to a strategy where data blocks to be sent are sent on multiple paths with a same sending time;

determine whether sending the data blocks using the sending time can satisfy the deadline;

in a case where the sending time satisfies that the data blocks reach the receiver before the deadline, perform data allocation according to the sending time;

in a case where the sending time does not satisfy that the data blocks reach the receiver before the deadline, adjust an allocation ratio of the data blocks on the multiple paths and transfer data on a path with large delay to a path with small delay until the data block sent on the path with large delay can satisfy the deadline of the data block; and in a case where after the transferring, the sending time still does not satisfy the deadline of data blocks, determine that the data block does not participate in this round of scheduling;

wherein the processor is configured to:

calculate a sending time {$send_i$} of each data block at the sender buffer, and take the maximum sending time as a threshold bound=max({$send_i$}) for determining whether a data block participates in data block scheduling;

calculate a slack time of each data block at the sender buffer according to a formula of:

$$slack_i = deadline_i - \max(sendt_k + propagt_k)$$

where, $deadline_i$ represents the deadline of the i-th block, $sendt_k$ and $propagt_k$ represent a transmission delay and a propagation delay of the block i on the kth path, respectively; and determine whether the data block participates in data block scheduling according to a formula of:

$$D_i = \begin{cases} \text{True,} & slack_i < bound \\ \text{False,} & else \end{cases}.$$

6. The device according to claim 5, wherein, when a new data block to be sent arrives at the sender, or when there is an idle path, or when the current network conditions changes, it is determined that the sending condition changes.

7. The device of claim 6, wherein when a new data block arrives at the sender, the data blocks to be sent at the sender is rescheduled according to deadlines and priorities of the data blocks.

8. The device of claim 5, wherein the processor is further configured to:

divide the data blocks to be sent according to deadlines and priorities of the data blocks to be sent, store the data blocks to be sent into corresponding priority queues, and select the data block with the shortest sending time in the highest priority queue for priority sending during scheduling, wherein the highest priority queue is selected from non-empty priority queues having at least one of the data block.

* * * * *